Nov. 19, 1935.  R. BORGFELDT  2,021,830
PISTON RING
Original Filed Oct. 6, 1933

WITNESSES

INVENTOR
Richard Borgfeldt
BY
ATTORNEYS

Patented Nov. 19, 1935

2,021,830

UNITED STATES PATENT OFFICE 2,021,830

PISTON RING

Richard Borgfeldt, Metuchen, N. J.

Application October 6, 1933, Serial No. 692,528
Renewed April 19, 1935

2 Claims. (Cl. 309—43)

The present invention relates to piston rings and it has for its object to so construct a piston ring that it will at all times be held in contact with the wall of the cylinder and firmly supported in its groove or seat in the piston in such manner that there will be no possibility of any tipping movement between the ring and its groove or seat or any loose or chattering action.

A further object of the invention is to provide a piston ring of the usual and ordinary construction with a cushioning device carried upon its inner face in position to make contact with the base of the groove or seat and to yieldingly press the body of the piston ring radially so as to insure at all times a close movable contact between the outer surface of the ring and the inner wall of the cylinder so as to compensate for any wearing away of the contact surfaces during the reciprocation of the piston, this cushioning device augmenting and supplementing the normal expansive action of the ordinary split ring piston.

To the above ends the present invention consists of a piston ring provided with a seat cushion upon its inner face, formed integrally therewith and extending from end to end thereof. It further consists of the devices and combinations of devices which will be hereinafter set forth and claimed.

The invention is illustrated in the accompanying drawing, in which

Similar reference characters will be employed to designate corresponding parts.

Figure 3:
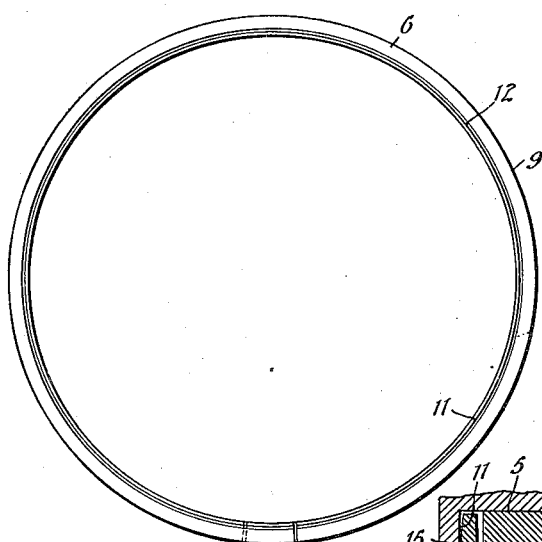
Figure 3 is a top plan view of the piston ring removed.
Figure 4:
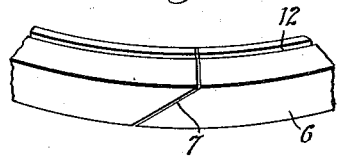
Figures 4 and 5 are fragmentary perspective views showing in elevation two different forms of the overlapping ends of the piston ring shown in Figure 3.
Figure 5:
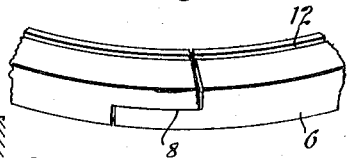

In the drawing, 1 indicates a portion of an engine cylinder; 2 represents a piston; 3 represents the piston rod pivotally connected to a diametrically extending shaft 4 carried by the piston. All of these parts are as usual in such constructions and may be made of any suitable metal, it being quite common to make the piston 2 of some light, strong metal such as aluminum or an aluminum alloy. As usual in such constructions, the piston 2 at or near its upper end and upon its outer face is provided with a plurality of annular grooves 5, forming the seats for the piston rings 6. The piston rings 6 are made of steel or other suitable metal, in the usual form of a spit ring, the ends of the ring overlapping as indicated in Figures 3, 4, and 5, and beveled as indicated at 7 in Figure 4, or stepped as indicated at 8 in Figure 5, this arrangement being such as to permit a slight expansion and contraction of the ring in applying it to the seats in the piston, and in its operation, with the outer face 9 of the ring in contact with the inner face 10 of the cylinder 1. As usually constructed, the piston rings depend entirely on this expanding action for the operative contact between the outer face of the piston ring and the inner face of the cylinder.

To insure always a close, smooth, and effective contact between the outer face of the piston ring and the inner face of the cylinder, I have provided the piston ring with a yielding seat cushion 11 which as shown in the drawing consists of an inner ring concentric with the main body of the piston ring, and, as shown, constituting an integral part of the construction, the seat cushion being formed by cutting an annular groove 12 from the top of the piston ring to a point 13 very closely approximating the lower face of the ring. The slot 12 is tapered as shown from the top to the bottom, thus forming a clearance space between the seat cushion 11 and the main body of the ring 6. The upper edge of the ring constituting the seat cushion 11 will be in a plane somewhat lower than the top of the main body of the ring as indicated at 14, thus providing clearance for a slight yielding spring movement without danger of contacting the top wall of the seat or groove. Preferably the piston including the seat cushion will be of such size in cross section as compared to the cross sectional area of the seat or groove 5, so that when the piston ring is placed therein the inner surface of the upper end of the seat cushion 11 will contact with the back wall of the seat or groove 5 thus to force the outer face of the piston ring 6 into contact with the inner face 10 of the cylinder 1 as shown.

Figure 1:
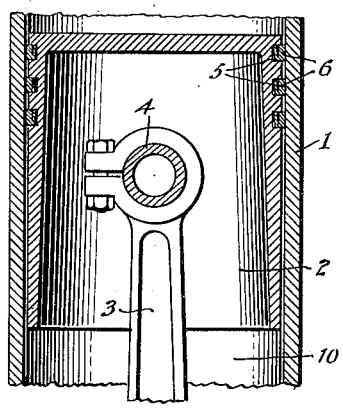
Figure 1 is a diametrical cross section of a portion of an engine cylinder and of the piston and a plurality of the piston rings supported thereon, other parts being shown in elevation.
Figure 2:
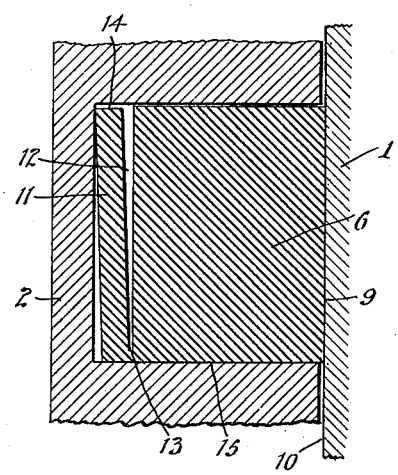
Figure 2 is a very much enlarged view showing in cross section my improved piston ring and adjacent parts of the piston and cylinder wall.
Figure 6:
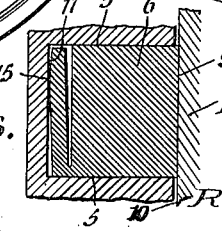
Figure 6 is a cross section similar to Figure 2 but on a reduced scale, at the same time on an enlarged scale as compared with the full size device, of a modified form of the device.

In Figure 6 I have shown a modified form of the construction in which the inner face of seat cushion 11 which contacts with the base wall of the seat or groove 5 will be provided with a slightly curved portion 15 to make contact with the base wall of the seat 5, the construction shown in Figure 6 being otherwise the same as that shown in Figure 2. The operation of the device it is thought has been made clear from the foregoing description of its construction.

I claim:

1. In combination, a piston having an annular ring seat the upper and lower walls of which are in parallel planes, a piston ring comprising an annular body having upper and lower plane surfaces, an annular slot formed therein perpendicular to the plane of the body and closely adjacent to its inner face and extending from its upper plane surface to a point closely adjacent its lower plane surface, dividing the body above the lower end of the slot into two members, the inner member being relatively thin as compared to the outer member and forming a seat cushion integral with the outer member and spaced therefrom from its point of union to its free edge, the contact face of said seat cushion being inclined to provide a clearance below its point of contact with the back wall of the ring seat of the piston; the seat cushion being co-extensive with and extending from end to end of the annular body, the arrangement being such that when the piston ring is inserted in the ring seat of the piston the upper open end of the slot will be overlapped and entirely covered by the upper wall of the ring seat.

2. The combination of piston and piston ring set forth in claim 1 in which the upper edge of the inner member or seat cushion of the piston ring is slightly below the upper edge of the outer member.

RICHARD BORGFELDT.